M. B. HODGSON.
CASSETTE FOR X-RAY FILMS.
APPLICATION FILED MAY 6, 1918.
1,367,601.
Patented Feb. 8, 1921.
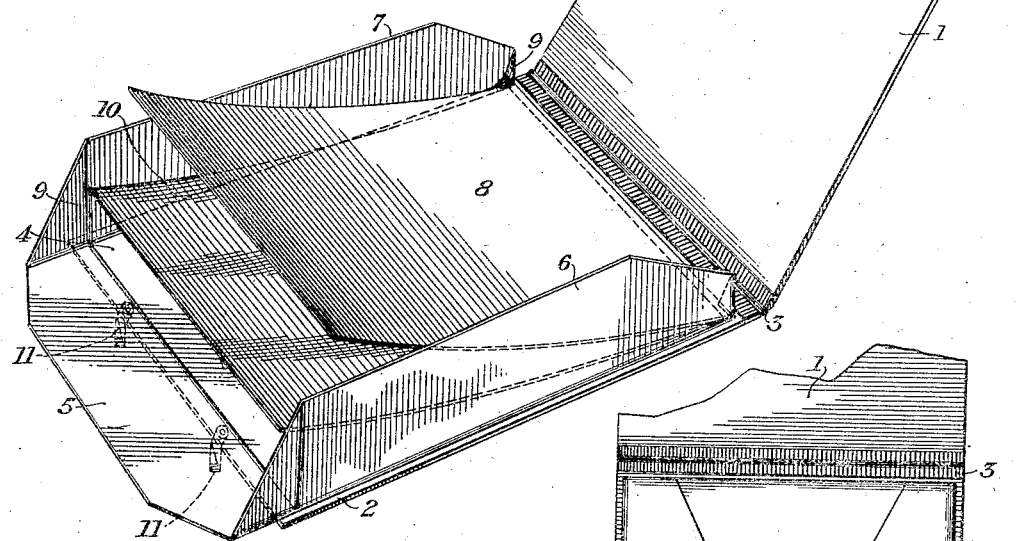
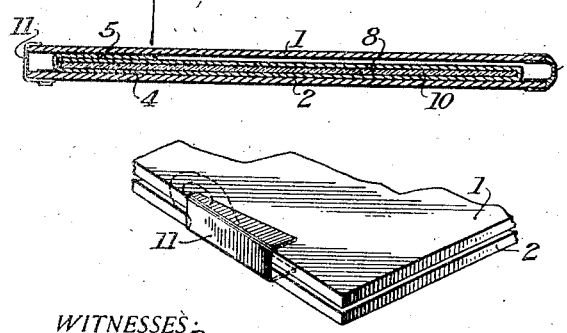
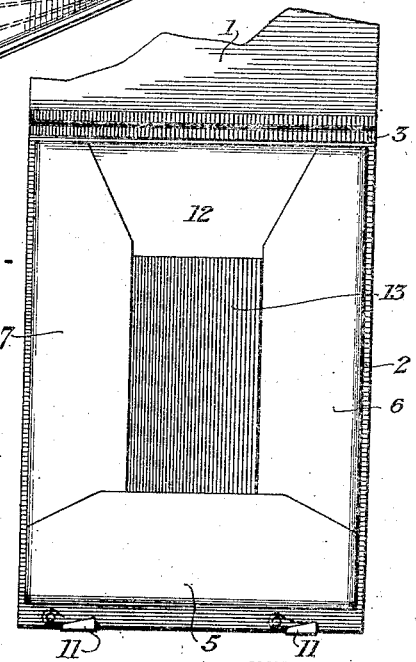
WITNESSES
INVENTOR.
Millard B. Hodgson
BY Ray L. Stinchfield
Newton N. Perrins
ATTORNEYS.

UNITED STATES PATENT OFFICE.

MILLARD B. HODGSON, OF ROCHESTER, NEW YORK.

CASSETTE FOR X-RAY FILMS.

1,367,601.     Specification of Letters Patent.     Patented Feb. 8, 1921.

Application filed May 6, 1918. Serial No. 232,961.

*To all whom it may concern:*

Be it known that I, MILLARD B. HODGSON, a citizen of the United States of America, residing at Rochester, in the county of Monroe and State of New York, have invented certain new and useful Improvements in Cassettes for X-Ray Films, of which the following is a full, clear, and exact specification.

My invention relates to holders or cassettes for X-ray plates or films. It is my object to produce a simple and cheaply made cassette which is easy to use and into which a film may be placed without buckling or bending. It will be apparent from an inspection of the description herein contained and the claims appended hereto wherein the novelty resides and what the advantages of this cassette are.

Reference is made to the accompanying drawings in which:

Figure 1 is a perspective view of one embodiment of my invention;

Fig. 2 is a plan view of a portion of a second embodiment;

Fig. 3 is a longitudinal section of the cassette as in use, and

Fig. 4 is a fragmentary view showing the particular catch used to hold the cassette closed.

Referring now in detail to the drawing, in which like reference characters are used to represent like parts in all figures, the cassette comprises two leaves, one of which 1 serves as a cover and the other 2 as a back. These are joined by any form of hinge as, for instance, the flexible connection 3. These leaves are made of cardboard and are opaque to light rays but are uniformly pervious to X-rays. It is important that the composition should be very uniform, so that the X-rays may pass through all portions with equal ease to avoid mottling the film contained within. If desired, they may be waterproofed.

Upon the back 2 is attached by an adhesive an envelop which consists of a rectangular sheet 4 having integral therewith the flaps 5, 6, 7 and 8. The flaps are connected by the light seals 9 at the corners between them, so that when folded it will be impossible for light to enter the envelop at these corners. The end flap 5 and the side flaps 6 and 7 are relatively narrow. As the flap nearest the hinged end of the back is made longer than the other and fits down upon the sheet 4, so as to fill in the space between the other flaps, the narrow flaps may then be folded over this cover flap and the envelop is then light-tight. It is apparent that the envelop flaps, light seals and cover are made from one piece folded in a simple way. They are made of strong paper which is impervious to light rays but uniformly pervious to X-rays and may be waterproofed to prevent any deleterious action upon the film from any pigment or other material in the paper of the envelop.

I also contemplate making the cover of a separate piece from the other parts of the envelop. This is shown in Fig. 2 in which the flap 12 adjacent the hinge is also made narrow and the separate cover piece 13 fitting the sheet 4 may be placed within the envelop and all the flaps folded down upon it. X-ray films usually come in packages in which films and sheets of opaque paper are packed alternately, and it is my intention that the user will take a film from such a package and in using the form shown in Fig. 2 will place it upon the sheet 4 and then place over it the opaque piece of paper that accompanies it, using it as the cover 13.

In order to hold the cassette tightly closed I employ any desired form of catch or fastener, such as the fastener 11 which is pivoted to the back and the channel part of which holds the cover and back tightly together.

In use an X-ray film 10 is placed in the envelop, the cover 8 or 13 placed thereover and the flaps turned down over the cover. The cover 1 is closed over the envelop and secured in place by the catches 11. This is done in a dark room. The cassettes each holding a film are taken into the operating room and the entire cassette placed in the exposure position subject to impression by X-rays in the usual manner. I find this form of envelop advantageous in that the films which are frequently of large dimension may be placed therein without sliding, as would be necessary in some of the envelops now in use which are open at one end and into which films must be slid edgewise. This is frequently accompanied by buckling of the film and scratching of the emulsion thereon.

Having thus described my invention, what I claim and desire to secure by Letters Patents of the United States, is:

1. A cassette for X-ray plates, comprising two leaves, one serving as a cover and the other as a back, flaps attached to the back and surrounding an area into which an X-ray plate may be placed and over which the flaps may be folded.

2. A cassette for X-ray films comprising two leaves, flaps attached to one leaf and surrounding an area into which an X-ray film may be placed, there being provided a cover to be placed over such a film.

3. A cassette for X-ray films, comprising two leaves hingedly connected, flaps attached to one leaf and surrounding an area into which an X-ray film may be placed, there being provided a cover to be placed over such a film, light seals between the flaps, and means to hold the leaves together.

4. A cassette for X-ray films, comprising two leaves, one serving as a cover and the other as a back, flaps attached to the back and forming an inclosure, one of the flaps being shaped to fit between the other flaps and fill the inclosure, and the other flaps being narrow, so that an X-ray film may be placed within the inclosure, the first mentioned flap folded down thereover as a cover and the narrow flaps folded over it.

5. A cassette for X-ray films, comprising two leaves hingedly connected at one edge and an envelop between the leaves, the envelop comprising a sheet attached to one leaf and having flaps at its edges adapted to be folded over the sheet and light seals between the flaps, one of the flaps being shaped to fit between the other flaps to cover the sheet, and the other flaps being narrow and adapted to fold over the first named flap, the material of the leaves and flaps being waterproof and impervious to light rays and pervious to X-rays, and means for holding the leaves together.

6. A cassette for X-ray plates, comprising two leaves, one serving as a cover and the other as a back, flaps attached to the back and surrounding an area into which an X-ray plate may be placed and over which the flaps may be folded, all the elements made of material impervious to light rays and pervious to X-rays, and at least part of the elements being waterproofed.

Signed at Rochester, New York, this 1st day of May, 1918.

MILLARD B. HODGSON.